United States Patent [19]

Iwata et al.

[11] Patent Number: 5,233,492

[45] Date of Patent: Aug. 3, 1993

[54] FLYING TYPE COMPOSITE MAGNETIC HEAD HAVING MN-ZN FERRITE CORE

[75] Inventors: Hitoshi Iwata, Kumagaya; Kazumi Noguchi, Saitama; Ryo Goto; Masanobu Yamazaki, both of Mooka, all of Japan

[73] Assignee: Hitachi Metals, Ltd., Tokyo, Japan

[21] Appl. No.: 962,057

[22] Filed: Oct. 16, 1992

Related U.S. Application Data

[63] Continuation of Ser. No. 612,908, Nov. 14, 1990, abandoned.

[30] Foreign Application Priority Data

Nov. 14, 1989 [JP] Japan ................................ 1-295334

[51] Int. Cl.⁵ ............... G11B 5/60; G11B 5/235; G11B 5/127
[52] U.S. Cl. ........................... 360/103; 360/120; 360/125; 360/126
[58] Field of Search ............... 360/110, 126, 103, 120, 360/127

[56] References Cited

U.S. PATENT DOCUMENTS

| | | |
|---|---|---|
| 3,562,444 | 2/1971 | Hoogendoorm et al. |
| 3,823,416 | 7/1974 | Warner |
| 4,316,228 | 2/1982 | Fujiwara et al. ........... 360/127 |
| 4,439,794 | 3/1984 | Shiroishi et al. |
| 4,809,103 | 2/1989 | Lazzari ........................... 360/126 |
| 5,008,767 | 4/1991 | Iwata et al. .................... 360/126 |
| 5,021,909 | 6/1991 | Shiiba .............................. 360/110 |
| 5,072,322 | 12/1991 | Yasar et al. .................... 360/103 |

FOREIGN PATENT DOCUMENTS

| | | |
|---|---|---|
| 55-125519 | 9/1981 | Japan . |
| 56-163518 | 12/1981 | Japan . |
| 57-569 | 1/1982 | Japan . |
| 58-14311 | 1/1983 | Japan . |
| 60-154310 | 8/1985 | Japan . |
| 61-199219 | 9/1986 | Japan . |
| 62-18968 | 4/1987 | Japan . |

OTHER PUBLICATIONS

PCT Search Report.

*Primary Examiner*—A. J. Heinz

[57] ABSTRACT

A floating magnetic head comprises a pair of magnetic core pieces which face each other through a gap and a metal magnetic film formed on the surface facing the gap of one of the pair of magnetic core pieces. The pair of magnetic core pieces are made of a single crystal Mn-Zn ferrite, a plane of the magnetic core pieces being formed almost in parallel with the surface forming a main magnetic path, and a <100> direction in the plane being formed to meet a relation of an angle $\theta$ to be $26° < \theta \leq 45°$ between the <100> direction and the surface facing the gap.

7 Claims, 10 Drawing Sheets

F I G. 12
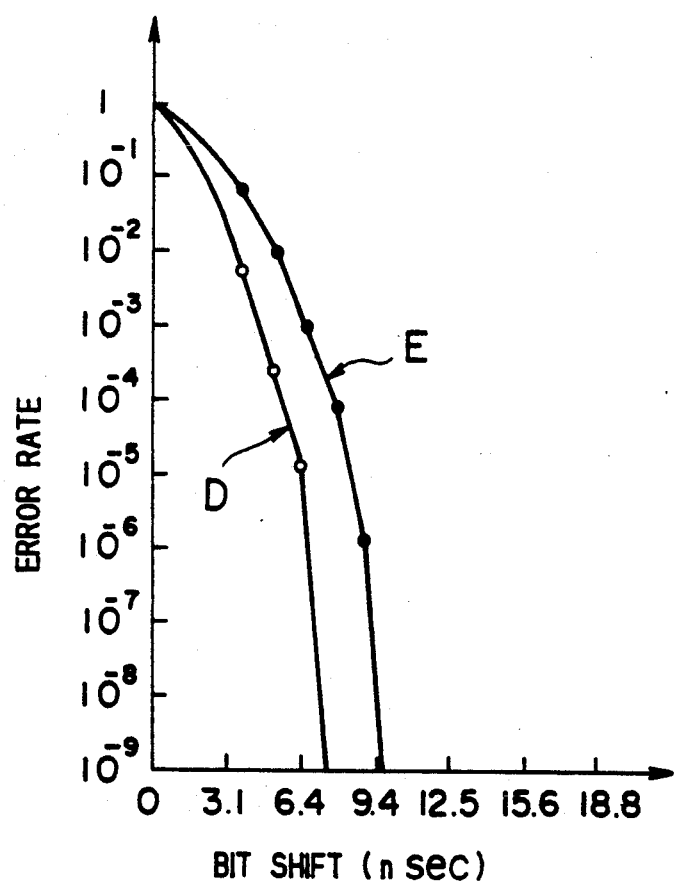

FLYING TYPE COMPOSITE MAGNETIC HEAD HAVING MN-ZN FERRITE CORE

This application is a continuation of application Ser. No. 07/612,908, filed Nov. 14, 1990, now abandoned.

BACKGROUND OF THE INVENTION

The present invention relates to a floating magnetic head to be used by floating it slightly above a surface of a recording medium in a magnetic disk drive. Particularly, the present invention relates to a structure of a floating composite magnetic head having a metal magnetic thin film of a high-saturation magnetic flux density formed adjacent to a non-magnetic magnetic gap, which is suitable for recording and reproduction of a high coercive force recording medium.

As magnetic heads which are used for writing and reading information in a magnetic disk drive, there are floating magnetic heads having structures as disclosed in the U.S. Pat. No. 3,823,416 and the Japanese Patent Publication JP-B-57-569, for example. According to these floating magnetic heads, a magnetic head is structured by providing a magnetic gap at a trailing terminal portion of a slider which is made of a high permeability oxide magnetic material and a whole structure is constituted by a high permeability oxide magnetic material. These floating magnetic heads of the above constitution, however, have a problem that they cannot be properly applied for recording in a recording medium of high coercive force that has come to be used in the recent years to meet the requirement of high recording density, because these floating magnetic heads have a saturated magnetic flux density of around 5,000 Gauss for a ferrite which is a high permeability oxide magnetic material.

In order to solve the above problem, a magnetic head having a metal magnetic thin film of high saturation magnetic flux density formed on a gap-facing surface has also come to be used. In other words, this is a magnetic head having a metal magnetic thin film of high saturation magnetic flux density provided on only a surface facing the magnetic gap of a floating magnetic head, a slider and a magnetic core piece of which are constituted by soft-ferrite, as disclosed in the JP-A-58-14311, for example. However, the magnetic head having this improved structure still has a problem that it has a large inductance after a predetermined winding has been provided at an electromagnetic transducing section, causing a reduction in resonance frequency which makes recording and reproduction at a high frequency disadvantageous. The magnetic head of the above constitution has a high inductance because the whole of the magnetic head is constituted by a magnetic material.

Accordingly, in order to have a low inductance, it is considered desirable to have a small magnetic circuit. From this point of view, a floating composite magnetic head having such a structure that a magnetic core is buriedly fixed in a non-magnetic slider was first disclosed in the U.S. Pat. No. 3,562,444. The inventors of the present invention also proposed a desirable shape of a floating composite magnetic head having a magnetic core buried in a non-magnetic slider, in the Patent Gazette of JP-A-61-199219. This floating composite magnetic head is characterized in that, as compared with the floating magnetic head of the above description where the whole of the magnetic head is constituted by a magnetic material, the latter floating compound has lower inductance after a predetermined winding is provided in a electro-magnetism transducing section so that recording at a high frequency becomes advantageous.

Further, in order to obtain a floating composite magnetic head of low inductance which can sufficiently record on a recording medium of high coercive force, it is ideal to have such a structure that a Mn-Zn ferrite of high saturation magnetic flux density is used as a substrate of magnetic cores and the magnetic cores having a thin metal film magnetic material of high saturation magnetic flux density adjacent non-magnetic magnetic gap section are buried in a non-magnetic slider. As an example of this floating composite magnetic head, there is a one invented by the inventors of the present invention as disclosed in JP-A-60-154310.

On the other hand, as the magnetic head becomes more compact and thinner and the track becomes narrower to meet the requirement of higher capacity of magnetic recording, there occurs a problem of a smaller reproduction output of recording in the magnetic head. Therefore, in order to improve recording and reproducing characteristics, a magnetic head using a single crystal Mn-Zn ferrite is used in a VTR magnetic head, for example, as disclosed in JP-A-62-18968 and JP-A-56-163518.

That is, JP-A-62-18968 discloses a magnetic head which has two high permeability magnetic materials facing each other through a magnetic gap, at least one of said high permeability magnetic materials being made up of a single crystal Mn-Zn ferrite, the (110) plane of the single crystal Mn-Zn ferrite being almost in parallel with the surface on which a main magnetic path is formed, and an angle e between the <100> direction in the (110) plane and the surface forming the magnetic gap being in the range of 5° to 40° or 80° to 120°, and in which glass is fused adhered to at least the surface of the high permeability magnetic material near the side of the magnetic gap, said glass having a compression factor lower than that of ferrite when temperature is reduced from the glass sticking temperature to the room temperature. JP-A-56-163518 discloses a magnetic head which is constituted in a similar manner as that of JP-A-62-18968 by using a single crystal Mn-Zn ferrite which has solid-soluted $SnO_2$.

SUMMARY OF THE INVENTION

It is an object of the present invention to provide a floating magnetic head which minimizes variance of peak intervals of a signal waveform to minimize recording/reproducing errors even if recording and reproducing are repeated in a high density recording.

In a magnetic disk drive, for example, information which has been sent as an electrical signal is recorded as presence or absence of a magnetization inversion on a magnetic disk by a magnetic head. The recorded information is also reproduced by the magnetic head to produce a signal waveform having a peak corresponding to magnetization inversion of the magnetic disk. This peak is detected, and recorded information is reproduced. FIG. 14 is a diagram explaining the outline of the processing of a reproduced signal in the process of reproducing a signal by using a circuit shown in FIG. 13. An output from a magnetic head 41 is amplified by a preamplifier 42 and is passed through a filter 43 to eliminate noise so as to obtain a signal waveform as shown in (a), for example. Thereafter, the peak of the reproduced signal is zero-cross converted by a differentiation circuit 44 to obtain a signal waveform (b). Then, a peak pulse corresponding to the zero-cross is generated by a comparator 45 to obtain a signal waveform (c). The peak pulse is discriminated into "1" or "0" by using a pulse called a data window. For this data window, an output signal waveform (d) of a PLO46 (Phase Lock Oscillator) which oscillates in synchronism with the peak pulse is used. In this case, the signals (a), (b), (c) and (d) of FIG. 14 correspond to signs or signals (a), (b), (c) and (d) shown in the circuit of FIG. 13. When a peak pulse is within the time of the data window, "1" is discriminated, and when there is no peak pulse within the time of the data window, "0" is discriminated, and information recording the result of discrimination is output.

Accordingly, in order to accurately record and reproduce information, a peak pulse must be correctly located within the data window. In an actual drive, however, there occurs a deviation in the peak pulse from a recorded position, mainly because of interferences of adjacent waves called a pattern-peak-shift and noises which superpose on the reproduced signal. The above positional deviation of the peak pulse may also occur due to irregular movement of a reproduced waveform which is considered to be attributable to the magnetization switching mechanism in the magnetic head.

In the mean time, a further increase in the memory capacity of the magnetic disk drive has been requested in the recent years, as described previously. For this purpose, a line recording density needs to be increased. Improvement in the line recording density means a reduction in the positional distance of magnetization switching recorded on the magnetic disk, which inevitably reduces the interval between peak pulses to be reproduced. Since the interval between data windows which are generated in synchronism with the peak pulses is also reduced, the width of the data window is also reduced. Therefore, when the position of a peak pulse is deviated because of various reasons as described above, the peak pulse is easily deviated from the data window. In other words, the higher the line recording density, the smaller the allowance of the peak pulse deviation from the data window.

However, in the floating magnetic head of the structure which has so far been known, a positional deviation of a peak pulse is pretty large. Particularly, in the line recording density of 30KFCI (Kilo Flux Change Per Inch) and above, it has been pointed out that the conventional magnetic head cannot be used because of many errors, which is a recent technical problem to overcome. To cope with this technical problem, appearance of a higher-performance magnetic head has been looked for.

In order to meet the above requirement, it is an object of the present invention to provide a floating composite magnetic head which minimizes variance of peak intervals when recording and reproducing are repeated and which prevents a peak from deviating from a data window even in a high-density recording.

In order to achieve the above object, according to the present invention, a floating magnetic head comprises a magnetic core portion and a slider which supports the magnetic core portion. The magnetic core portion has a pair of magnetic core pieces (e.g. I-formed core and C-formed core) faced each other through a non-magnetic gap and fixed by a glass (primary glass), with a metal magnetic thin film being formed on at least one of opposite sides facing the gap of said pair of magnetic core pieces. Said magnetic core pieces are made of single crystal Mn-Zn ferrite, with its (110) plane set in almost in parallel with the surface forming a main magnetic path, and an angle between the <100> direction in the (110) plane of each magnetic core piece and a surface facing the gap forming an angle $\theta$ larger than 26° and not larger than 45° (26°<$\theta$≦45°).

In the present invention, Fe-Ni alloy, Fe-Al-Si alloy and other known alloys can be used as the above-described metal magnetic thin film, preferable composition of Fe-Al-Si alloy (so-called Sendust) is 4.6–8.0 wt. % Al, 4.0–9.0 wt. % Si, balance Fe and may contain Ti and/or Ru less than 2 wt. %. Further, single crystal Mn-Zn ferrite of a known component can be used as a single crystal soft-ferrite constituting I and C magnetic core pieces. These can be suitably selected in accordance with the characteristics of the magnetic recording medium used.

In the present invention, the magnetic core is constituted by a single crystal soft magnetic ferrite. However, according to the technical idea of the above-described JP-A-56-163518 and JP-A-62-18968, tensile stress is generated within a ferrite near the magnetic gap when a pair of magnetic core pieces are fixed with glass, and magnetic anisotropy of the ferrite is controlled by the existence of this tensile strength so that recording and reproducing characteristics are enhanced, and at the same time, anti-abrasion characteristics of the magnetic core with the VTR magnetic tape which is a recording medium is also aimed to be improved.

Accordingly, in the above-described Patent etc., application of a floating magnetic head which operates in non-contact with a recording medium has not been substantially disclosed. Further, existence of stress in the magnetic core having a metal magnetic thin film disposed on a single crystal Mn-Zn ferrite is different from the existence of stress in ferrite only, so that it cannot be directly applied. In the case of a floating composite magnetic head having a magnetic core buried in a non-magnetic slider, not only primary glass but also a magnetic core are fixed within a slit with glass (secondary glass). Thus, the existence of stress becomes more complex, and therefore, this floating composite magnetic head cannot be applied directly by expecting the operational effect disclosed in the above Patents.

In the present invention, the angle $\theta$ formed between the direction <100> in the (110) plane of each magnetic core piece of the magnetic core and the surface facing the gap is set to be in excess of 26° and not larger than 45° (26°<$\theta$≦45°) in order to obtain excellent recording and reproducing characteristics with an extreme small deviation of a peak pulse within this range, as described later.

As described above in detail, the floating magnetic head according to the present invention has a small variance of a peak shift and has a satisfactory symmetry of waveforms. Accordingly, the floating magnetic head has a smaller bit shift which enables a higher-density recording, with a large industrial effect.

DESCRIPTION OF THE DRAWINGS

FIG. 12 is a diagram for comparatively explaining the result of measuring bit shifts by the magnetic head of the present invention having the structure shown in FIG. 8 (label D) and the conventional magnetic head (label E) respectively;

DESCRIPTION OF THE PREFERRED EMBODIMENTS

The present invention will be explained in detail with reference to the embodiments. It should be noted, however, that the present invention is not limited to the scopes of these embodiments.

EMBODIMENT 1

Figure 1:
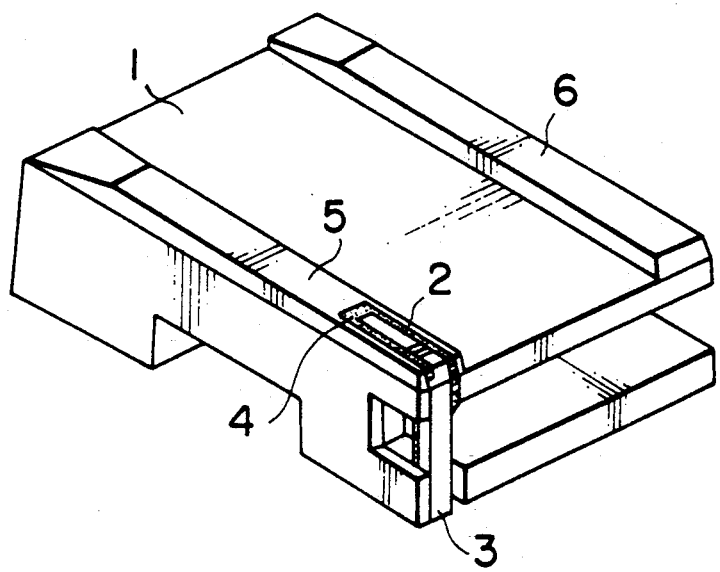
FIG. 1 is a perspective view showing a schematic structure of a floating composite magnetic head in one embodiment of the present invention.

FIG. 1 shows a perspective view of the overall structure in one embodiment of the floating composite magnetic head according to the present invention. In FIG. 1, 1 designates a non-magnetic slider, 2 a slit section provided in one of side rails 5 of the slider 1, 3 a magnetic core buried in the slit section 2, 4 a glass for fixing the magnetic core 3, and 6 the other side rail of the slider 1. It is desirable that a non-magnetic ceramic consisting of $CaTiO_3$ of thermal expansion coefficient $105 \sim 115 \times 10^{-7}/°$ C. and pore ratio not larger than 0.5% is used for the slider 1.

Figure 2:
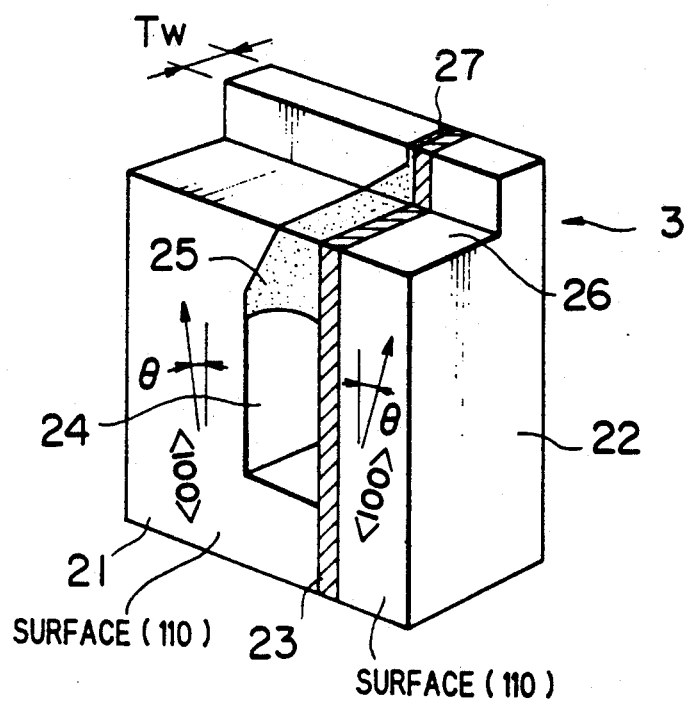
FIG. 2 is an enlarged perspective view of a magnetic core in the floating composite magnetic head in FIG.1.

FIG. 2 is an enlarged perspective view of the above magnetic core 3. In FIG. 2, 21 and 22 designate magnetic core pieces called a C-formed core piece and an I-formed core piece respectively made of single crystal Mn-Zn ferrite, and 23 designates a magnetic thin film made of an Fe-Al-Si alloy (6 wt. % Al, 9 wt. % Si, bal. Fe) formed on the I-type core piece 22. 24 designates a space for minding formed between the C-formed core piece 21 and the I-formed core piece 22. On top of the space 24, a glass section 25 is provided to connect the C-formed core piece 21 and the I-formed core piece 22 together. 26 designates a recess section to restrict a track width Tw. A magnetic gap 27 is formed by a non-magnetic film such as $SiO_2$ or the like sputtered. A primary glass for connecting the above pair of magnetic core pieces depends on the material of the magnetic core pieces. It is desirable that a primary glass having a softening point of 560° C. to 600° C. and a fixing temperature of 450° C. to 490° C. and a thermal expansion coefficient of $93 \sim 111 \times 10^{-7}/°$ C. at the temperature from 30° C. to the fixing temperature, for example, is used. The fixing temperature means temperature at which stress is beginning to happen in glass when the glass temperature is lowered from a high temperature. A glass for fixing the magnetic core in the slit formed on the slider is suitably selected depending on the composition of the primary glass and the slider material. For example, a glass having a softening point of 420° C. to 470° C. and a thermal expansion coefficient of $82 \sim 100 \times 10^{-7}/°$ C. at 30° C.$\sim$280° C. is used as secondary glass.

An example of main features of a floating composite magnetic head prepared was as follows:

| | | |
|---|---|---|
| Gap length | Gl | 0.6 μm |
| Gap depth | Gd | 2 μm |
| Track width | Tw | 11 μm |
| Fe—Al—Si film thickness | | 2.2 μm |

The magnetic cores 3 of the present embodiment were made of a single crystal Mn-Zn ferrite, and its face bearing was such that the (110) plane was almost parallel to the main magnetic path formation surface, as shown in FIG. 2. In the present embodiment, six kinds of magnetic heads were prepared so that the angles θ formed by the direction <100> of the magnetic core piece and the gap-forming surface of the C-formed and I-formed magnetic core pieces respectively were 20°, 35°, 60°, 80°, 90° and 100°.

Figure 3:
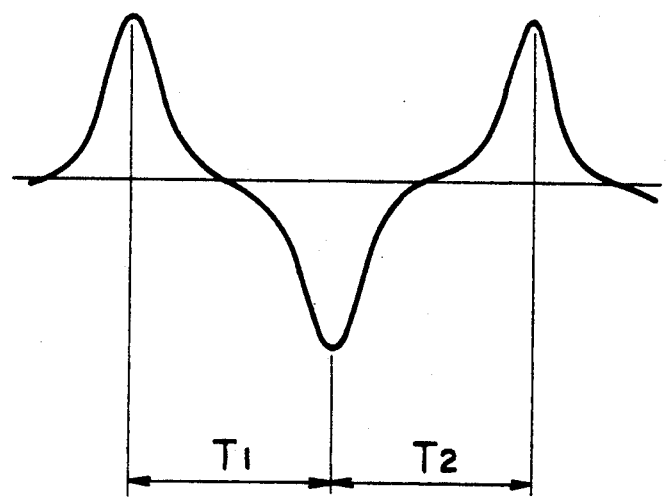
FIG. 3 is a diagram showing measured positions of $T_1$, $T_2$ and outputs.

Reproduction output voltage and $T_1-T_2$ were measured for each of the magnetic heads produced. $T_1$ represents the time from the peak at the positive side to the peak at the negative side, and $T_2$ represents the time from the peak at the negative side to the peak at the positive side as shown in FIG. 3. Recording and reproduction were repeated 50 times for each of the magnetic heads, and $T_1$ and $T_2$ were measured each time. $T_1-T_2$ is an index to indicate symmetry of a waveform. If $T_1-T_2$ "0", it can be considered that the waveform is almost symmetrical and that there is no peak shift. Measuring conditions were as follows.

| | |
|---|---|
| Recording medium: | 5¼ inches diameter, Co—Ni sputtered magnetic film |
| Medium coercive force: | 1200 Oe |
| Speed: | 9.75 m/sec |
| Floating height: | 0.15 μm |

| | |
|---|---|
| Number of coil windings: | 26 × 2 turns |
| Recording frequency: | 4 MHz |

Figure 4:
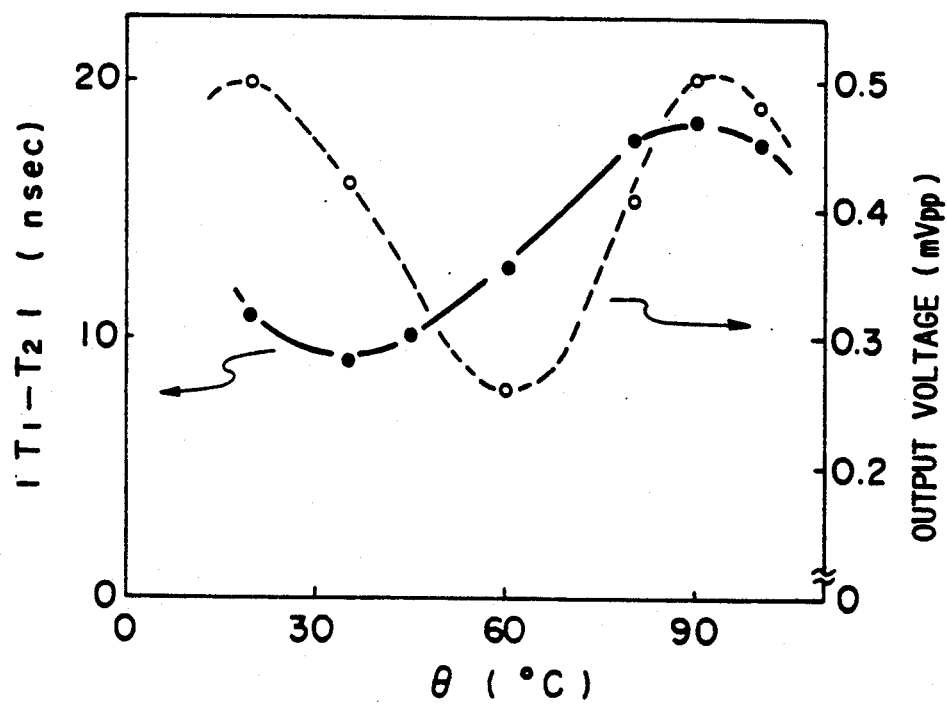
FIG. 4 is a diagram showing a relation between an angle θ formed by <100> direction of the magnetic core piece and the surface facing the gap and an output voltage, and a relation between the same angle θ and $|T_1-T_2|$.

The result of measuring is shown in FIG. 4. From this diagram, it is understood that the output voltage was maximum when the angle θ formed by the <100> direction of each magnetic core piece and the gap-forming surface is approximately 20° and approximately 95° respectively, that $|T_1-T_2|$ which indicates non-symmetry of a reproduced output was minimum when the angle θ is 35°, and that an excellent symmetry is obtained when the angle θ is in the range of approximately 26° to 40°, when $|T_1-T_2|$ is not more than 10 nsec.

For the purpose of comparison, a floating composite magnetic head having the same shape as that of the present invention was prepared, in which, however, only core material was constituted by a polycrystalline ferrite (accordingly, the portion of the sides facing the non-magnetic gap of the magnetic head was constituted by a plurality of crystal particles), and $|T_1-T_2|$ was similarly measured. As a result of the measuring, the reproduction output was 0.35 m Vpp, and $|T1-T2|$ was approximately 19 nsec.

In the conventional floating magnetic head using a polycrystalline ferrite, causes of the occurrence of a peak shift are not necessarily clear. However, the following are considered to be the main reasons.

① There are several ferrite particles near the
There are magnetic gap, and anisotropic directions of individual ferrite particles do not agree so that magnetic structure becomes unstable. As a result, magnetic structure changes each time recording and reproduction are repeated, and output variation and waveform distortion occur.

② When the ferrite particle near the magnetic gap is small, a section with deteriorated magnetic characteristics occurs near the gap so that the magnetic structure becomes unstable. As a result, magnetic structure changes each time recording and reproduction are repeated, and output variation and waveform distortion occur.

③ When the recording density becomes high, a leakage of magnetic flux from the medium becomes less, and the ferrite permeability is lowered at a high frequency so that a reproduction output becomes lower at a high recording density. As a result, there may easily occur influences of noises such as head noises, medium noises and amplifier noises, and output variation and waveform distortion occur.

One or more of the above reasons are considered to be the causes of the occurrence of a peak shift. According to the present invention, a single crystal is used in which there are no plurality of ferrite particles near the gap and the magnetic domain structure is stable in the plane direction. Further, an easy magnetization direction <100> of the single crystal is in the direction suitable for recording and reproduction. Therefore, an excellent effect is considered to be obtained.

Figure 5:
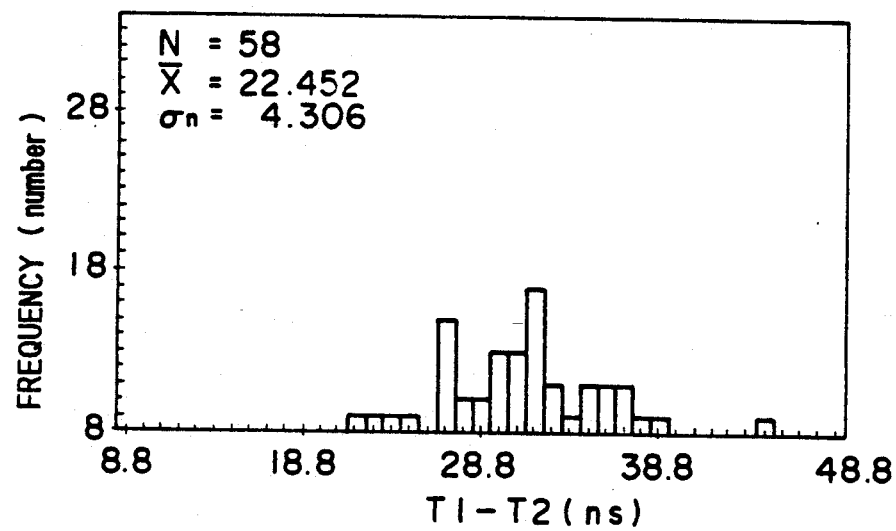
FIG. 5 is a distribution diagram of $T_1-T_2$ when recording and reproduction are repeated 50 times in the conventional floating composite magnetic head.
Figure 6:
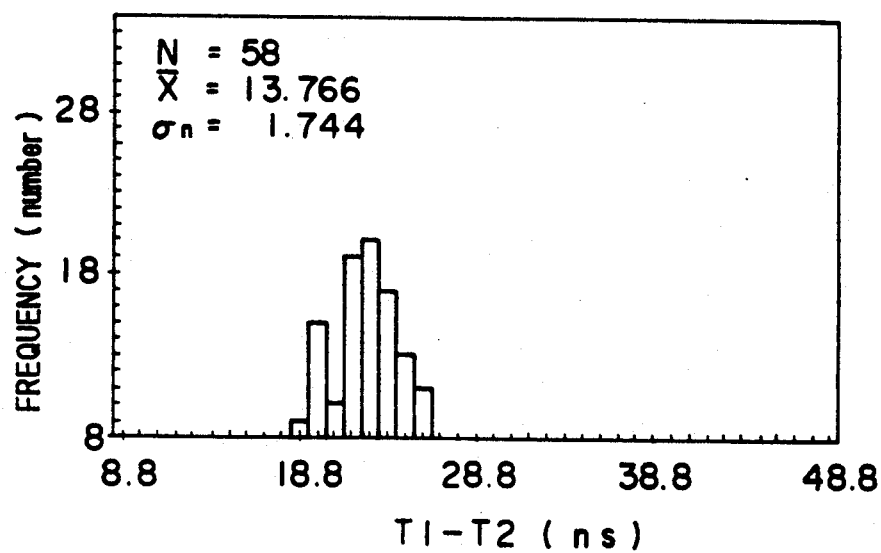
FIG. 6 is a distribution diagram of $T_1-T_2$ when recording and reproduction are repeated 50 times in the floating composite magnetic head of the present invention.

FIGS. 5 and 6 show the results of measuring $|T_1-T_2|$ by using the conventional composite magnetic head which was used as the comparative example in the above Embodiment 1 and the floating composite magnetic head according to the present invention in which the angle θ formed by the <100> direction of the magnetic core piece and the gap-forming surface was 35°, having the structure shown in FIG. 1, respectively. The measuring conditions used are that recording was performed on the medium of coercive force Hc=1200 Oe at a speed of 9.75 m/sec, with a floating height 0.15 μm and at a recording frequency of 4 MHz, and $T_1$ and $T_2$ of the output were measured from the reproduced waveform.

According to FIG. 5 which shows the result by using the conventional magnetic head, the average $\overline{X}$ of $T_1-T_2$ is as large as 22.5 nsec and the range of variance n is also pretty large, from 36 nsec to 13 nsec. With this magnetic head, data window width becomes smaller for a line recording density of 30 KFCI and above, so that there is a high probability that the peak is deviated from the data window, resulting in an error. Accordingly, it is difficult to perform a high density recording by using the conventional magnetic head. In contrast to this, it is understood from FIG. 6 which shows the result of measuring by using the magnetic head according to the present invention that the value of $T_1-T_2$ which indicates symmetry of a waveform becomes smaller and the variance thereof is also smaller.

Accordingly, it is apparent that the floating magnetic head according to the present invention can reduce the data window width as compared with the conventional magnetic head using a polycrystalline ferrite core, with a result that a high line recording density can be realized.

Figure 7:
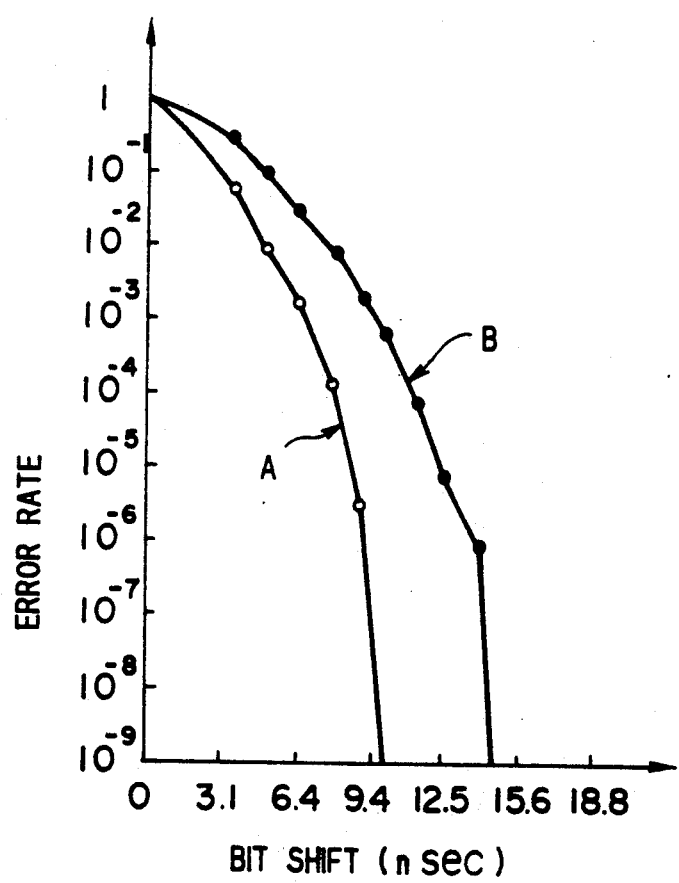
FIG. 7 is a diagram comparatively showing the results of measuring bit shifts by the floating composite magnetic head of the present invention (A) and the conventional floating composite magnetic head (B)

FIG. 7 is a diagram showing the result of measuring the bit shift, which becomes an indication for practical use, with the RWA 201B manufactured by Guzik Co., Ltd. The measurement conditions were:

| | |
|---|---|
| rotation speed | 9.75 m/sec |
| floating height | 0.15 μm |
| modulation | MFM |
| recording frequency | 1F: 2 MHz, 2F: 4 MHz. |

A curve shown by A shows the result of measuring by using the composite magnetic head of the present invention, and a curve shown by B shows the result of measuring by using the conventional composite magnetic head. A bit shift at the error rate $10^{-9}$ was approximately 14 nsec for the conventional magnetic head, whereas it was approximately 10 nsec for the magnetic head of the present invention, which shows a superior value. It can be understood from the above that a high line recording density of 30 KFCI and above can be realized by using the magnetic head of the present invention.

EMBODIMENT 2

Figure 8:
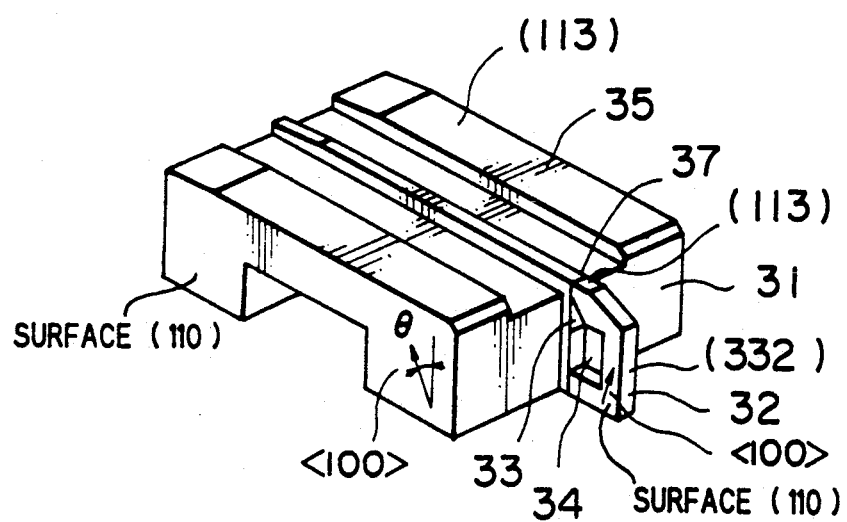
FIG. 8 is a perspective view of a monolithic floating magnetic head according to another embodiment of the present invention.
Figure 9:
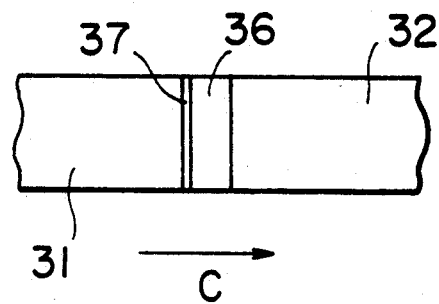
FIG. 9 is an enlarged diagram of the portion near the gap as observed from the floating surface side.

FIG. 8 shows a perspective view of the overall structure of the floating monolithic magnetic head according to another embodiment of the present invention. In FIG. 8, 31 designates a magnetic core half body having a floating slider section, and 32 designates a magnetic core half body having a winding groove 34, both magnetic core half bodies being connected together by a glass 33, and 35 designates a rail section for generating a floating pressure. Both the magnetic core half bodies 31 and 32 use a single crystal Mn-Zn ferrite respectively. The plane direction thereof is such that the surface facing the recording medium is (113) plane, the surface facing the gap is (332) plane, and both magnetic cores are connected together so that the <100> directions of the cores are coming apart from each other in the direction to the recording medium. The angle θ was 35°. FIG. 9 is an enlarged diagram of the section near the gap as observed from the side of the floating surface. The direction of an arrow C shows the moving direction of the recording medium. 36 designates a Fe-Al-Si thin film which is formed at only the trailing terminal of a gap 37.

For the sake of comparison, the conventional magnetic head was also prepared by using a polycrystalline ferrite, in the same manner as Embodiment 1. The conventional magnetic head prepared for the comparative example has the shape similar to that of the present embodiment, except that the magnetic core material is Mn-Zn polycrystalline ferrite and that the gap section is constituted by a plurality of crystals. Main features of the magnetic head prepared in the present embodiment were as follows.

| Gap length | Gl | 0.6 μm |
|---|---|---|
| Gap depth | Gd | 10 μm |
| Track width | Tw | 11 μm |
| Fe—Al—Si film thickness | | 2 μm |

Figure 10:
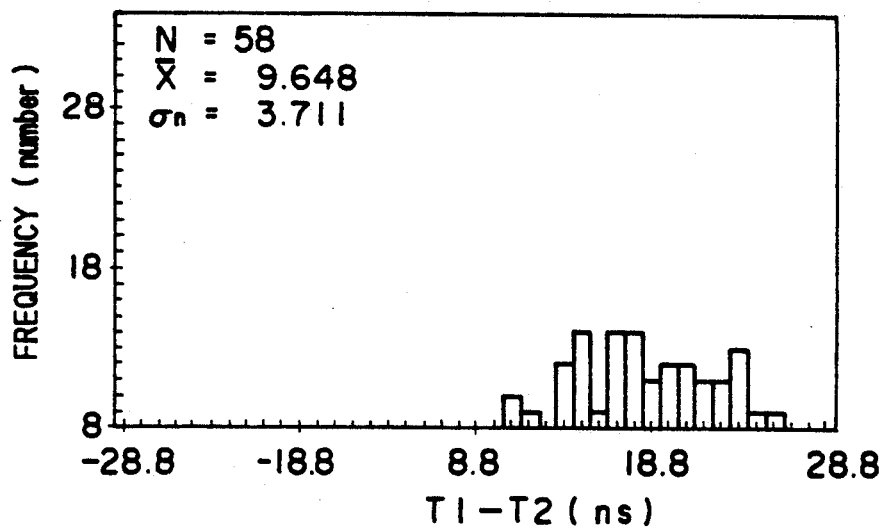
FIG. 10 is a diagram showing the relation between $T_1-T_2$ distribution when recording and reproduction are repeated 50 times by the conventional monolithic floating magnetic head.
Figure 11:
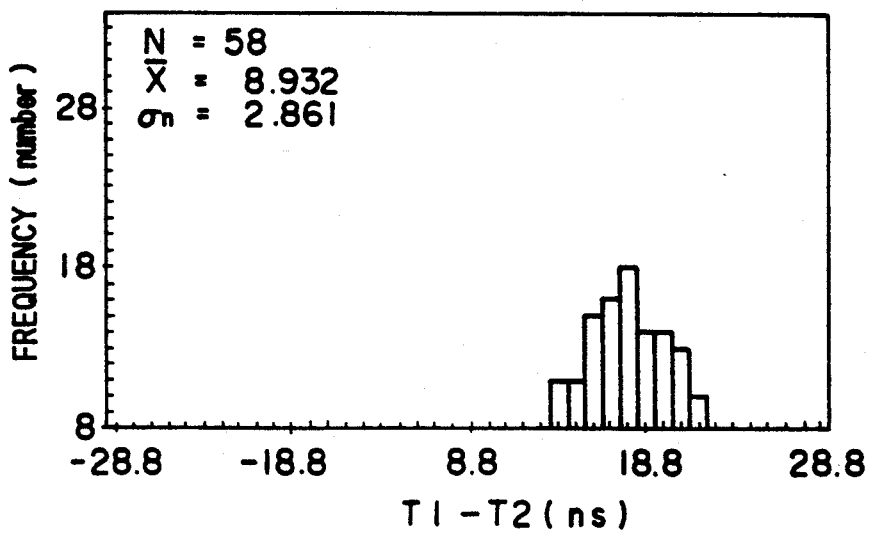
FIG. 11 is a diagram showing the relation between $T_1-T_2$ distribution when recording and reproduction are repeated 50 times by the monolithic floating magnetic head of the present invention having the structures shown in FIGS. 8 and 9.
Figure 13:
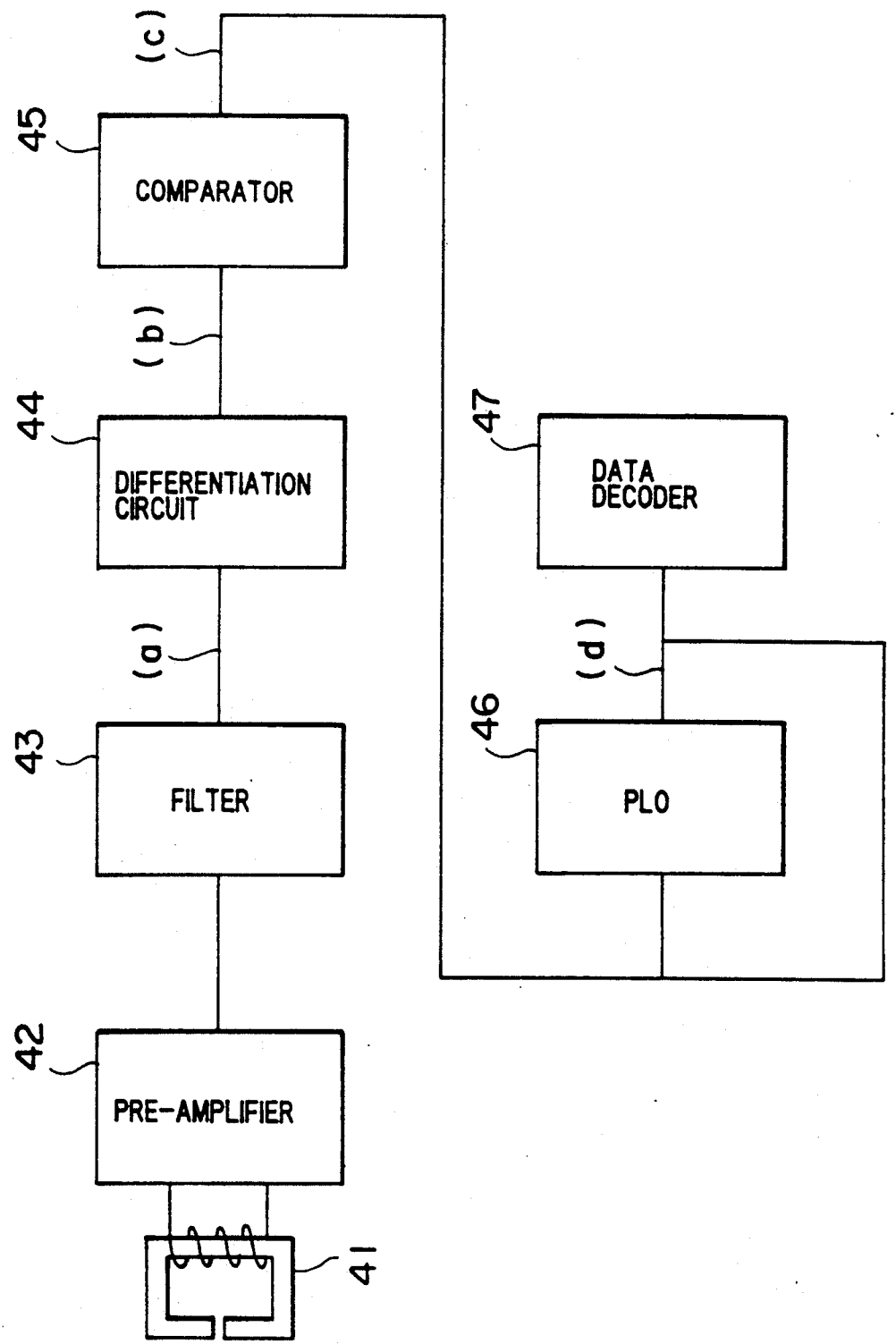
FIG. 13 is a block diagram of a read circuit of a disk drive.
Figure 14:
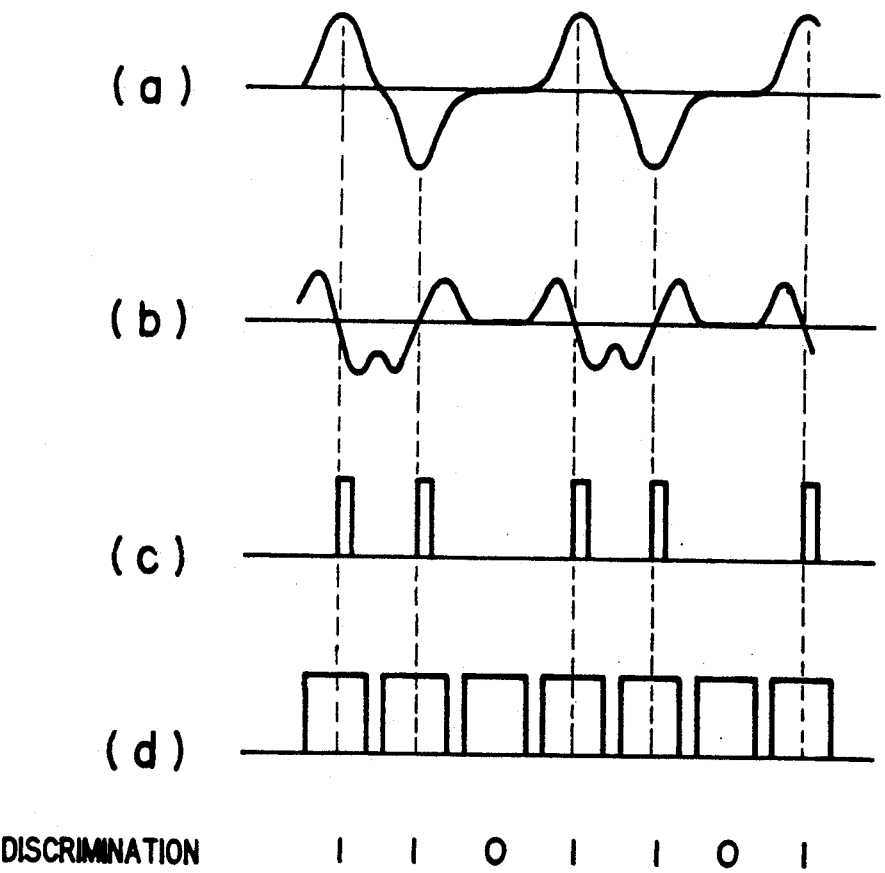
FIG. 14 is a diagram for explaining the outline of signal reproduction processing in the circuit shown in FIG. 13.

Variations of $T_1-T_2$ and bit shifts were measured by using the magnetic head of the present invention and the conventional magnetic head prepared respectively. The measuring conditions are the same as those of Embodiment 1. The results of measurings are shown in FIGS. 10 to 12. FIG. 10 shows the result of measuring by using the conventional magnetic head and FIG. 11 shows the result of measuring by using the magnetic head of the present invention. When both diagrams are compared, it can be observed that the value of $T_1-T_2$ which indicates non-symmetry of a waveform is smaller, with a smaller variance, for the magnetic head of the present invention. FIG. 12 is a diagram showing the result of measuring a bit shift which becomes an index for a practical application. A curve shown by D shows the result of measurement by using the magnetic head of the present invention, which clearly indicates the superiority over the result of measurement by using the conventional magnetic head expressed by a curve shown by E. A bit shift for the present embodiment is much smaller than that of Embodiment 1. In other words, the structure of the present embodiment has an advantage over that of Embodiment 1 that the bit shift is more desirable though inductance becomes larger than that of Embodiment 1.

EMBODIMENT 3

Figure 15:
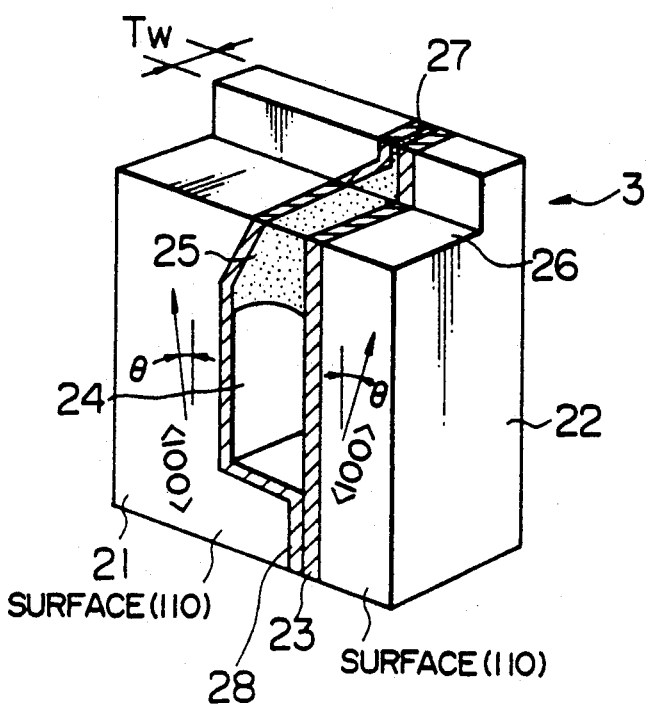
FIG. 15 is a perspective view showing a schematic structure of a floating composite magnetic head in a third embodiment of the present invention.

FIG. 15 shows a perspective view concerning a magnetic core in third embodiment of the present invention. The floating composite magnetic head in the third embodiment is a floating composite magnetic head in which magnetic thin films of Fe-Al-Si alloy are formed both on the gap-facing-surfaces of the C-formed core piece 21 and the I-formed core piece 22 in the first embodiment. The angle θ between the <100> direction of the magnetic core piece and the gap-forming-surface is 35 degrees. Main dimensions of the floating composite magnetic head are described below. Namely, the gap length $G_l$ is 0.6 μm. The gap depth $G_d$ is 2 μm. The track width Tw is 11 μm. The film thickness of Fe-Al-Si is 2 μm.

Figure 16:
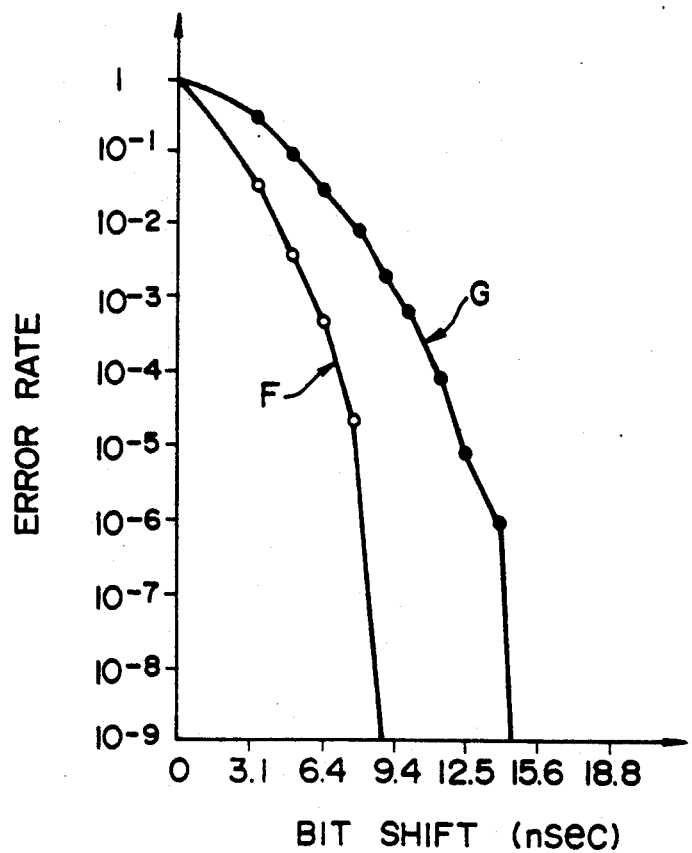
FIG. 16 is a diagram comparatively showing the results of measuring bit shifts by the floating composite magnetic head of the third embodiment (F) and the conventional floating magnetic head (G).

Bit shifts of the floating composite magnetic heads were measured by RWA201B fabricated by GUZIK Co., Ltd. The measurement conditions were the medium of Hc 1200 Oe, the rotational speed 9.75 μm, the floating height 0.15 μm, the modulation method; MFM, and the recording frequency 2F: 4 MHz, 1F: 2 MHz. Measured results are shown in FIG. 16. The measured result of the bit shift in the third embodiment is shown by the curve F. The measured result of the bit shift in the prior art is shown by the curve G. A bit shift at the error rate $10^{-9}$ of the third embodiment was approximately 9 nsec, whereas that in the prior art was approximately 14 nsec, which shows a superior value of the present invention. Further, a bit shift in the third embodiment is superior to that of approximately 10 nsec in the second embodiment. This superiority is due to that reproducing output power of the floating composite magnetic head in the third embodiment is larger than that in the prior art by more than 20%.

We claim:

1. A floating magnetic head including a slider having a slit comprising:
    a pair of magnetic core pieces each formed in a <100> direction and having a surface, the surface of each of the magnetic core pieces facing each other through a gap having a gap surface; and
    a metal magnetic film formed on the surface of at least one of said pair of magnetic core pieces facing the gap surface of said gap,
    said pair of magnetic core pieces being made of a single crystal Mn-Zn ferrite having a (110) plane, and the (110) plane of said single crystal Mn-Zn ferrite forming said pair of magnetic core pieces being substantially parallel with the surface of each of said pair of magnetic core pieces forming a main magnetic path,
    the <100> direction existing in said (110) plane forming an angle θ with said surface facing said gap having a value set to be in excess of 26° and not larger than 45° to reduce a peak shift of reproduction output voltage measured from the floating magnetic head defined by a difference |T1−T2| between a first period T1 from a first positive peak to a first negative peak and second period T2 from the first negative peak to a second positive peak, the peak shift being equal to or less than 10 nsec, and
    said pair of magnetic core pieces being connected to each other through a first glass material and fixed to the slider by a second glass material positioned in the slit of the slider.

2. A floating magnetic head according to claim 1, wherein one of said pair of magnetic core pieces is formed of an I-formed core piece having said gap and an other of said pair magnetic core pieces is formed of a C-formed core piece, said metal magnetic film being formed on the surface facing said gap of said I-formed core piece, and said I-formed core piece and said C-formed core piece are connected partly through said material magnetic film and said first glass material and connected partly through said metal magnetic film.

3. A floating magnetic head according claim 1, wherein each f the magnetic core pieces further comprises a recess section defining a track width, and wherein the first glass material is substantially level with the recess section.

4. A floating magnetic head according to claim 1, wherein line recording density of the floating magnetic head is equal to or greater than 30KFCI (Kilo Flux Change Per Inch).

5. A floating magnetic head including a slider having a slit comprising:
- a pair of magnetic core pieces each formed in a <100> direction and having a surface, the surface of each of the magnetic core pieces facing each other through a gap having a gap surface; and
- a metal magnetic film formed on the surface of at least one of said pair of magnetic core pieces facing the gap surface of said gap,
- said pair of magnetic core pieces being made of a single crystal Mn-Zn ferrite having a (110) plane, and the (110) plane of said single crystal Mn-Zn ferrite forming said pair of magnetic core pieces being substantially parallel with the surface of each of said pair of magnetic core pieces forming a main magnetic path,
- <100> direction existing in said (110) plane forming an angle θ with said surface facing said gap having a value set to be in excess of 26° an not larger than 45° to reduce a peak shift of reproduction output voltage measured from the floating magnetic head defined by a difference |T1−T2| between a first period T1 from a first positive peak to a first negative peak and a second peak T2 from the first negative peak to a second positive peak, and
- said pair of magnetic core pieces being connected to each other through a first glass material and fixed to the slider by a second glass material positioned in the slit of the slider.

6. A floating magnetic head according to claim 5, wherein said peak shift is equal to or less than 10 nsec.

7. A floating magnetic head according to claim 5, wherein a line recording density of the floating magnetic head is equal to or greater than 30KFCI (Kilo Flux Change Per Inch).

* * * * *

UNITED STATES PATENT AND TRADEMARK OFFICE
CERTIFICATE OF CORRECTION

PATENT NO. : 5,233,492
DATED : August 3, 1993
INVENTOR(S) : IWATA, et al.

It is certified that error appears in the above-identified patent and that said Letters Patent is hereby corrected as shown below:

Col. 11, line 17, insert --the-- before "<100>".

Col. 12, line 1, change "an" to --and--.

Signed and Sealed this

Twenty-sixth Day of July, 1994

Attest:

BRUCE LEHMAN

*Attesting Officer*     *Commissioner of Patents and Trademarks*